(12) United States Patent
Bergquist

(10) Patent No.: US 7,184,009 B2
(45) Date of Patent: Feb. 27, 2007

(54) DISPLAY CIRCUIT WITH OPTICAL SENSOR

(75) Inventor: Johan Bergquist, Tokyo (JP)

(73) Assignee: Nokia Corporation, Espoo (FI)

( * ) Notice: Subject to any disclaimer, the term of this patent is extended or adjusted under 35 U.S.C. 154(b) by 211 days.

(21) Appl. No.: 10/176,741

(22) Filed: Jun. 21, 2002

(65) Prior Publication Data
US 2003/0234759 A1    Dec. 25, 2003

(51) Int. Cl.
G09G 3/36 (2006.01)

(52) U.S. Cl. .......................... 345/90; 345/173

(58) Field of Classification Search .................. 345/90, 345/92, 93, 98, 99, 100, 104, 173, 179, 91, 345/94, 95, 96, 97
See application file for complete search history.

(56) References Cited

U.S. PATENT DOCUMENTS

| | | | |
|---|---|---|---|
| 4,655,552 A | | 4/1987 | Togashi et al. |
| 5,194,862 A | * | 3/1993 | Edwards ....................... 341/20 |
| 5,536,932 A | * | 7/1996 | Hack et al. ............... 250/208.1 |
| 5,536,950 A | | 7/1996 | Liu |
| 5,812,109 A | * | 9/1998 | Kaifu et al. ................ 345/104 |
| 5,838,308 A | * | 11/1998 | Knapp et al. ............... 345/173 |
| 5,861,583 A | * | 1/1999 | Schediwy et al. ....... 178/18.06 |
| 5,945,972 A | * | 8/1999 | Okumura et al. ............. 345/98 |
| 6,058,223 A | | 5/2000 | Stobehn |
| 6,380,931 B1 | * | 4/2002 | Gillespie et al. ............. 345/173 |
| 6,392,636 B1 | * | 5/2002 | Ferrari et al. ................ 345/173 |
| 6,583,439 B2 | * | 6/2003 | Yamazaki et al. ............. 257/59 |
| 6,587,097 B1 | * | 7/2003 | Aufderheide et al. ....... 345/173 |
| 6,661,733 B1 | * | 12/2003 | Pan et al. .............. 365/230.05 |
| 6,816,144 B2 | * | 11/2004 | Tsuchi ........................ 345/100 |
| 2004/0164944 A1 | * | 8/2004 | Miyazawa et al. ............. 345/98 |

FOREIGN PATENT DOCUMENTS

| | | |
|---|---|---|
| EP | 0363948 A2 | 4/1990 |
| EP | 0573045 A2 | 12/1993 |
| EP | 0384509 A2 | 8/1999 |
| WO | WO 2004/001712 A1 | 12/2003 |

* cited by examiner

*Primary Examiner*—Richard Hjerpe
*Assistant Examiner*—Jean Lesperance
(74) *Attorney, Agent, or Firm*—Alston & Bird LLP

(57) ABSTRACT

A combined input/output device having a display mode in which it operates as a matrix display and sensing mode in which it receives optical input, comprising multiple picture element circuits arranged as a matrix display and multiple optical sensors arranged as a sensor matrix. The optical sensors and pixel circuits are integrated on the same substrate and the control lines used for controlling the pixel circuits are advantageously re-used for controlling the optical sensors. A plurality of optical sensors are enabled at a time, thereby allowing for the discrimination of inputs by gesture.

24 Claims, 3 Drawing Sheets

DISPLAY CIRCUIT WITH OPTICAL SENSOR

CROSS-REFERENCE TO RELATED APPLICATIONS

Not Applicable

BACKGROUND OF THE INVENTION

There exist a number of different input and output devices suitable for use in a human machine interface (HMI). A popular output device is the active matrix flat panel display.

FIG. 1 illustrates a flat-panel display device having a display matrix 2 and control circuitry 4 for controlling the display matrix. The display matrix 2 in this example is monochrome and comprises an N row by M column array of picture element (pixel) circuits $15_{nm}$, each comprising a pixel. A colour display is accomplished by dividing each pixel into sub pixels the number of which is the same as they number of primary colours (usually three for red, green, blue, RGB). The portion of the display matrix 2 corresponding to n=1, 2 and 3 and m=1, 2 and 3 is illustrated. Each of the N rows of pixel circuits $15_{1m}$, $15_{2m}$, $15_{3m}$ ... $15_{Nm}$, where m=1, 2, 3 ... M, has an associated row select line $21_n$. The row select line $21_n$ is connected to each of the pixel circuits $15_{n1}$, $15_{n2}$, $15_{n3}$ ... $15_{nM}$ in its associated row. If the row select line is asserted the pixel circuits in the associated row are enabled. If the row select line is not asserted, the pixel circuits in the associated row are not enabled. Each of the M columns of pixel circuits $15_{n1}$, $15_{n2}$, $15_{n3}$ ... $15_{nM}$, where n=1, 2, 3 ... M, has an associated data line $20_m$. The data line $20_m$ is connected to each of the pixel circuits $15_{1m}$, $15_{2m}$, $15_{3m}$ ... $15_{Nm}$ in its associated column. The pixel circuit $15_{nm}$ is enabled by asserting the row select line $21_n$ and the greyscale of a pixel (n,m) of an enabled pixel circuit $15_{nm}$ is determined by either the voltage, current, or electrical charge provided via the data line $20_m$.

The control circuitry 4 comprises timing control circuitry 6, column driver circuitry 8 and row selection circuitry 10. The timing control circuitry 6 receives an input from a computer (not shown) which indicates the greyscale value of each pixel of the display matrix 2 for one display frame and provides an output to the column driver circuitry 8 and to the row selection circuitry 10.

To paint an image on the display matrix 2, the row select lines and data lines are successively scanned. The row selection circuitry 10 asserts the select line $21_1$ and does not assert any other of the row select lines. The M pixel circuits $15_{1m}$, where m=1, 2, 3 ..., in first row of the display matrix 2 are thereby enabled. The column driver circuitry converts each of the greyscale values for the M pixels in row n provided from the computer to voltage values and applies the voltage to each of the M data lines $20_m$, where m=1, 2, 3 .... The voltage on a data line determines the greyscale of the enabled pixel associated with it. The selection circuitry asserts the select line $21_2$ for the next row and the process is repeated. Thus one row of pixels is painted at a time and each row is painted in order until the frame is complete. The computer then provides the greyscale value of each pixels of the display matrix 2 for the next frame and it is painted one row at a time.

The display may be an active matrix (AM) or a passive matrix (PM) display. In the PM mode, the pixel greyscale is only maintained while its associated row select line is asserted. For example, if a PM has 240 rows, each row is only switched on during 1/240 of the frame period. For displays with high pixel count and therefore a large number of rows, the pixel switch-on time becomes shorter and the contrast and brightness is therefore reduced. To solve this problem AM was introduced. Each pixel now has a means for maintaining its greyscale after its scan i.e. when its associated row select line is de-asserted.

Reflective displays modulate the light incident on the display and transmissive displays modulate light passing through the display from a backlight. Transflective displays are a combination of reflective and transmissive displays and allow viewing in the dark as well as in bright sunlight. Liquid crystal displays (LCDs) are commonly used in these types of displays. LCDs form an image by reorienting liquid crystal (LC) molecules using an electric field. The reorientation causes the polarisation-rotating properties to change and combining this with polarisers can be used to switch pixels on and off. A matrix of LCD pixels is controlled by applying a voltage to a selected combination of a row and a column via the data lines 20.

FIG. 2 illustrates a portion of an active matrix LCD (AMLCD). The pixel circuits $15_{nm}$ described in relation to FIG. 1 have been designated by the reference numerals $25_{nm}$ in FIG. 2 to indicate that they are AMLCD pixel circuits. The figure illustrates a first pixel circuit $25_{11}$ connected to the first data line $20_1$ and the first row scan line $21_1$ and a second pixel circuit $25_{21}$ connected to the data line $20_1$ and the second row scan line $21_2$. The first and second pixel circuits are identical. The first pixel circuit $25_{11}$ comprises a first switching field effect transistor $22_1$, a first liquid crystal picture element $23_1$ having an inherent capacitance and a first storage capacitor $24_1$. The gate of the first switching transistor $22_1$ is connected to the first row scan line $21_1$, its sources is connected to the first data line $20_1$ and its drain is connected to a terminal of the first liquid crystal picture element $23_1$ and to a plate of the first storage capacitor $24_1$. The other plate of the first storage capacitor $24_1$ is connected to the second row scan line $21_2$. The first switching transistor $22_1$ operates as a switch. When the first row scan line $21_1$ is asserted the transistor conducts and when it is not asserted it does not conduct. Thus when the first row scan line $21_1$ is asserted, the first storage capacitor $24_1$ is charged by the voltage applied via the first data line $20_1$ to set the greyscale of the first liquid crystal picture element $23_1$. When the first row scan line $21_1$ is no longer asserted the charged first storage capacitor $24_1$ maintains the correct voltage across the first liquid crystal picture element $23_1$ and maintains the correct greyscale. In this way, there is no reduction in contrast or brightness even for high-resolution displays.

The field effect switching transistors are normally thin film transistors (TFT) formed from semiconductors, in most cases hydrogenated amorphous silicon (a-Si:H) or low temperature polycrystalline silicon (p-Si). The data lines, scan lines, switching transistors and storage capacitors forming the display matrix can be integrated on a single substrate as an integrated circuit. The substrate is usually made from glass but increasingly also from plastics.

Emissive displays produce their own light. These types of displays include: field emission displays (FED); organic light-emitting diode (OLED) and thin-film electroluminescence displays (TFEL). While FEDs, OLEDs, and TFELs all can be passively driven, AM driving is preferred for the same reason as LCDs. The difference is that they are driven at constant current whereas LCDs rely on constant voltage. The intensity of the emitted light is controlled by current which, via the AM driving, is kept constant during one frame. It can also be controlled by the amount of charge via pulse-width modulation and constant current.

FIG. 3 illustrates a portion of a OLED active matrix display. The pixel circuits $15_{nm}$ described in relation to FIG. 1 are designated by the reference numerals $35_{nm}$ in FIG. 3 to indicate that they are OLED pixel circuits. The figure illustrates an exemplary emissive pixel circuit $35_{11}$ connected to the data line $20_1$, the row scan line $21_1$, a common anode 36 and a common cathode 37. The emissive pixel circuit $35_{11}$ comprises a switching field effect transistor 32, a light emitting diode 33, a storage capacitor 34 and a drive transistor 36. The gate of the switching transistor 32 is connected to the row scan line $21_1$, its source is connected to the data line $20_1$ and its drain is connected to a plate of the storage capacitor 34 and the gate of the drive transistor 36. The other plate of the storage capacitor 34 is connected to the common anode 36. The drain of the drive transistor is connected to the common anode 36 and the light emitting diode 33 is connected between the source of the drive transistor 36 and the common cathode 37.

The switching transistor 32 operates as a switch. When the first row scan line $21_1$ is asserted the switching transistor 32 conducts and when it is not asserted it does not conduct. Thus when the first row scan line $21_1$ is asserted, the voltage applied via the first data line $20_1$ controls the current flowing through the drive transistor 36 (and hence the intensity of the LED 33) and charges the storage capacitor 34. When the first row scan line $21_1$ is no longer asserted, the charged storage capacitor 34 maintains the correct voltage at the gate of the drive transistor 36 and thereby maintains the correct current through the LED 33 and thus the correct greyscale.

The field effect switching transistor and the first drive transistor 36 are normally thin film transistors (TFT) formed from semiconductors such as hydrogenated amorphous silicon (a-Si:H) or low temperature polysilicon (p-Si). The data lines, scan lines, switching transistors and storage capacitors forming the display matrix can be integrated on a single substrate as an integrated circuit.

It is desirable to use the display area provided by the flat panel display for optical input while it is being used for output. Thus far this has usually been achieved by using physically distinct touchscreen devices in combination with the flat panel display device. Resistive touchscreens are the most common touchscreens and comprise a glass or plastic substrate, an air gap with spacers and a flexible film. The opposing faces of the substrate and film are coated with a transparent electrode usually ITO. When touched the upper and lower surfaces are brought into contact and the resistances in the x and y direction are measured. These types of touch screens reduce the optical transmission from the underlying screen, introduce colour shift into a displayed image and may only have relatively small dimensions. Optical scattering against the spacer particles and the glass surface further reduces the image quality of the underlying display. Some of these disadvantages may be addresses by using more sophisticated, complex and costly touch screen technology. For example an optical touch screen may be used in which light is generated parallel to the display surface and a special pointing object touched on the display surface creates a shadow which is detected. However, this techniques requires expensive optical components such as lenses, mirrors and transmitters and has a limited resolution. Another technique detects surface acoustic waves travelling on a thick front glass, but this has limited resolution.

There therefore does not exist any satisfactory circuit which combines optical input with display output. The existing solutions may require extra components which add size, weight and expense. The existing solutions also suffer from insufficient resolution and if a touch screen is placed in front of the display it introduces parallax because the input and output planes are not co-planar and it reduces the image quality.

BRIEF SUMMARY OF THE INVENTION

It is an object of embodiments of the present invention to provide for optical input in combination with a flat-panel display without a significant increase in size and/or weight and/or cost.

It is an object of embodiments of the present invention to provide for higher resolution optical input in combination with a display.

It is an object of embodiments of the present invention to provide for optical input in combination with a display without a significant decrease in the quality of the images on the display.

Embodiments of the present invention provide circuits in which optical sensors and pixel circuits are integrated on the same substrate. This provides extremely good transparency to the pixel circuits, significantly reduces optical degradation and minimises parallax. It also reduces the size, cost and weight of devices. The use of integrated optical sensors, such as phototransistors, provides high resolution.

Embodiments of the present invention provide circuits in which optical sensors and pixel circuits are integrated on the same substrate and the control lines used for controlling the pixel circuits are advantageously re-used for controlling the optical sensors. This reduces the complexity of the circuit and allows existing driver hardware to used to drive the circuit with only minor modifications.

Embodiments of the invention provide circuits in which a plurality of optical sensors are enabled at a time, thereby allowing for the discrimination of inputs by gesture.

BRIEF DESCRIPTION OF SEVERAL DRAWINGS

For a better understanding of the present invention and to understand how the same may be brought into effect reference will now be made by way of example only to the following drawings in which.

Figure 5:
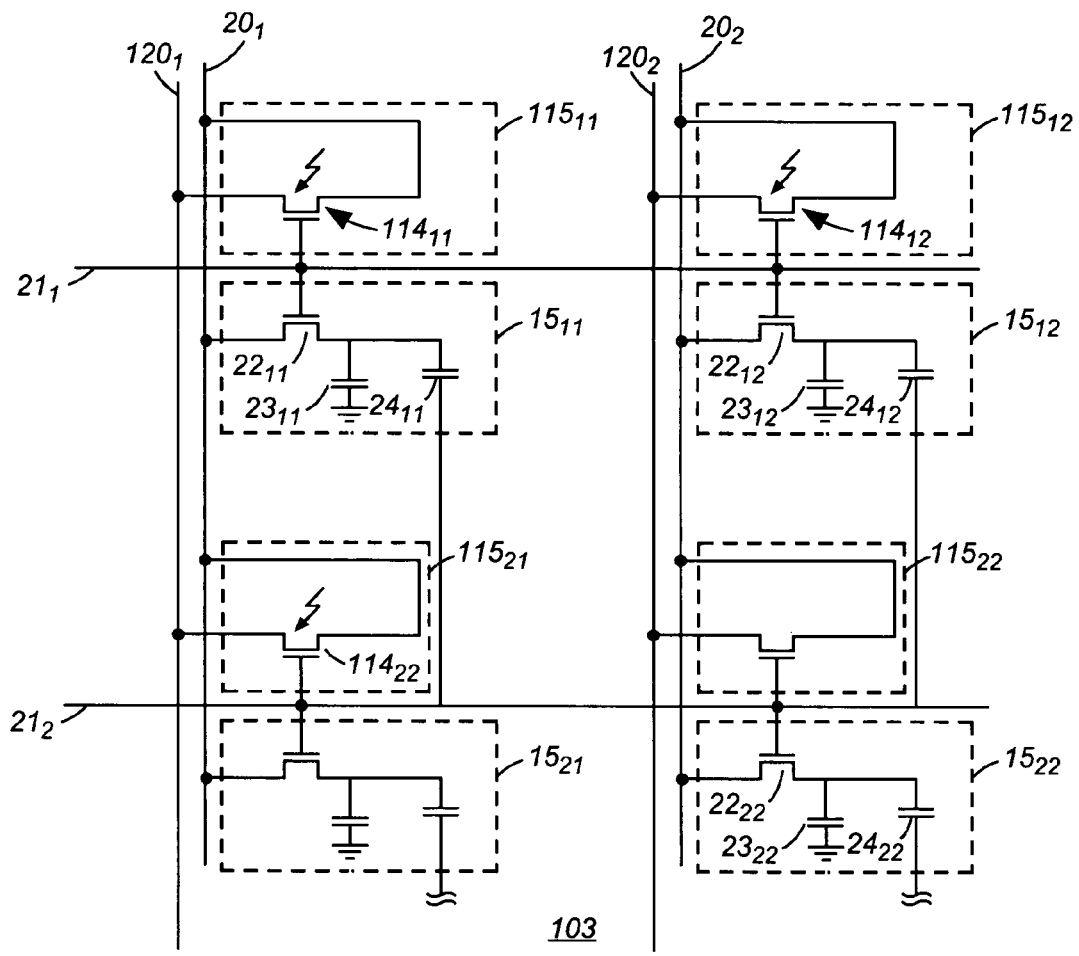
Figure 6:
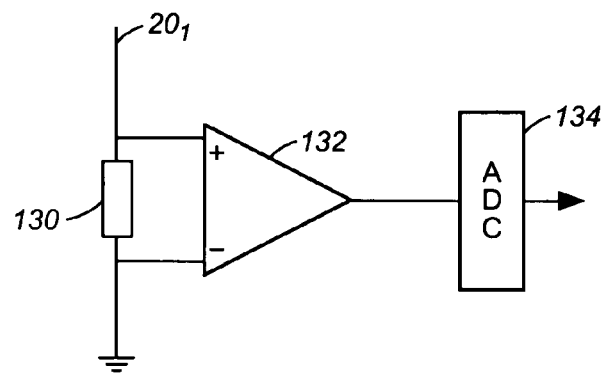

FIG. 5 schematically illustrates a portion of an integrated circuit forming the input/output matrix;

FIG. 6 illustrates a circuit for sensing the output from an optical sensor

DETAILED DESCRIPTION OF THE INVENTION

Figure 4:
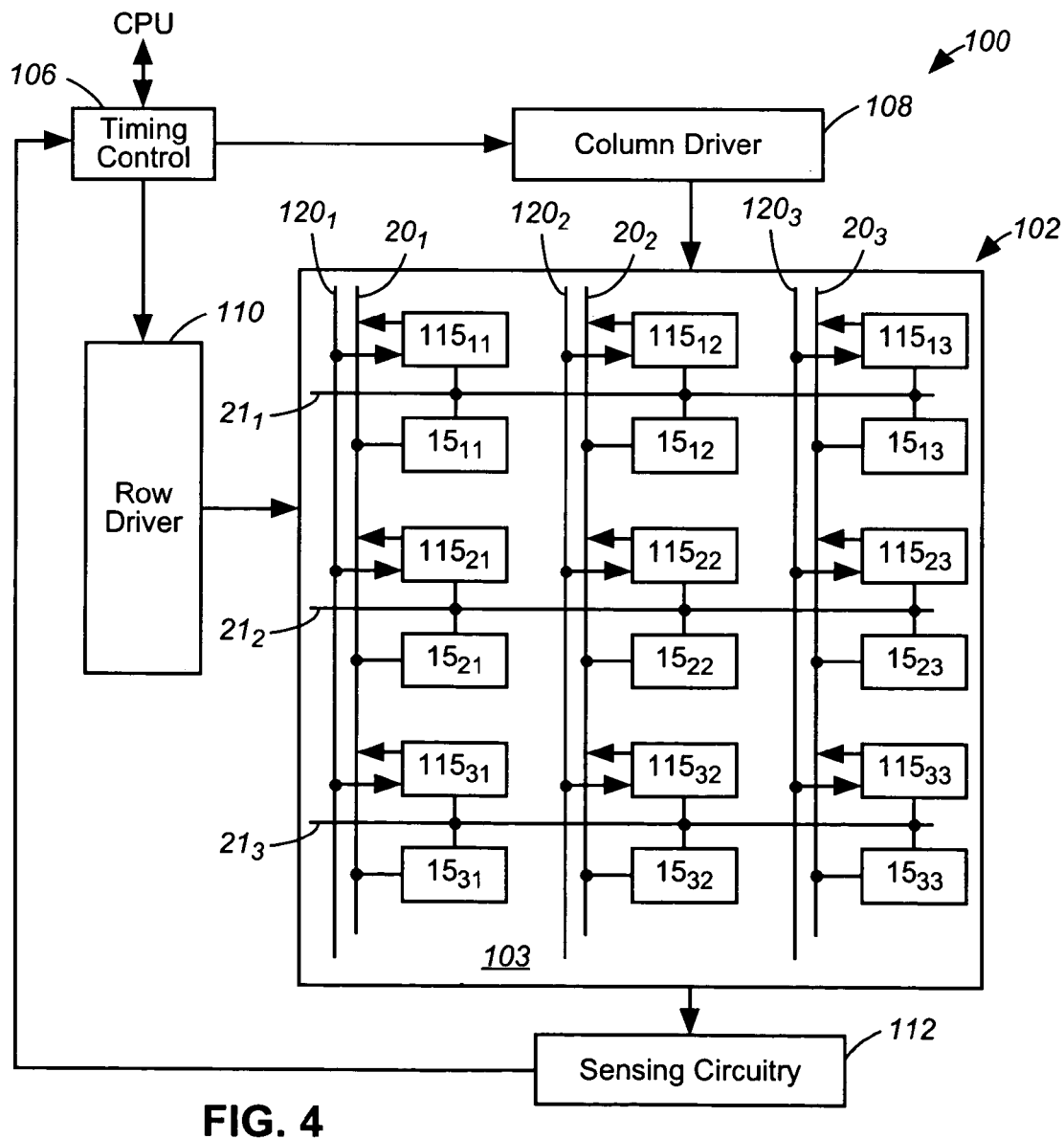
FIG. 4 illustrates a combined input/output device having an input/output matrix.

FIG. 4 illustrates a combined input/output device 100 having an input/output matrix 102 and control circuitry for controlling the input/output matrix. The input/output display matrix comprises a flat-panel display matrix with embedded optical sensors arranged in a matrix.

The input/output matrix 102 comprises a display matrix of picture element (pixel) circuits, each comprising a pixel integrated on a substrate 103. The display matrix in this example is monochrome and comprises an N row by M column array of picture element (pixel) circuits $15_{nm}$, each comprising a pixel. The portion of the display matrix 102 corresponding to n=1, 2 and 3 and m=1, 2 and 3 is illustrated. Each of the N rows of pixel circuits $15_{1m}$, $15_{2m}$, $15_{3m}$ ... $15_{Nm}$, where m=1, 2, 3 ... M, has its own associated row select line $21_n$ integrated on the substrate 103. The row select line $21_n$ is connected to each of the pixel circuits $15_{n1}$, $15_{n2}$, $15_{n3}$ ... $15_{nM}$ in its associated row. If the row select line is asserted the pixel circuits in the associated row are enabled. If the row select line is not asserted, the pixel circuits in the associated row are not enabled. Each of the M columns of pixel circuits $15_{n1}$, $15_{n2}$, $15_{n3}$ ... $15_{nM}$, where n=1, 2, 3 ... N, has an associated data line $20_m$ integrated on the substrate 103. The data line $20_m$ is connected to each of the pixel circuits $15_{1m}$, $15_{2m}$, $15_{3m}$ ... $15_{Nm}$ in its associated column. The pixel circuit $15_{nm}$ is enabled by asserting the row select line $21_n$ and the greyscale of a pixel (n,m) of an enabled pixel circuit $15_{nm}$ is determined by either the voltage, current, or charge provided via the data line $20_m$.

The input/output matrix additionally comprises a sensor matrix of optical sensors $115_{nm}$ arranged in N rows and M columns and integrated on the substrate 103. The portion of the matrix of optical sensors $115_{nm}$ corresponding to n=1, 2 and 3 and m=1, 2 and 3 is illustrated in FIG. 4.

Each of the N rows of optical sensors 115 is associated to a different row select line. A row select line is connected to each of the optical sensors in its associated row. Each of the M columns of optical sensors has an associated column select line $120_m$, where m=1, 2 ... M, integrated on the substrate 103. The column select line $120_m$ is connected to each of the N optical sensors $115_{1m}$, $115_{2m}$, $115_{3m}$ ... $115_{Nm}$ in its associated column. Each of the M columns of optical sensors has an associated data line. The data line is connected to each of the optical sensors in its associated column. A particular one of the N×M optical sensors $115_{nm}$ can be addressed by asserting its associated row select line and asserting its associated column select line $120_m$ and the optical value sensed is provided by its associated data line.

It is preferable for the sensor matrix of optical sensors to share some of the components of the display matrix of pixels, for example, as illustrated in FIG. 4.

In FIG. 4, each of the N rows of optical sensors $115_{1m}$, $115_{2m}$, $115_{3m}$ ... $115_{Nm}$, where m=1, 2, 3 ... M, has its own associated row select line $21_n$ integrated on the substrate 103. The row select line $21_n$ is shared by the optical sensors $115_{n1}$, $115_{n2}$, $115_{n3}$ ... $115_{nM}$ and the pixel circuits $15_{n1}$, $15_{n2}$, $15_{n3}$ ... $15_{nM}$.

In FIG. 4, each of the M columns of optical sensors $115_{n1}$, $115_{n2}$, $115_{n3}$ ... $115_{nM}$, where n=1, 2, 3 ... N has its own associated data line $20_m$ integrated on the substrate 103. The data line $20_m$ is shared by the optical sensors $115_{1m}$, $115_{2m}$, $115_{3m}$ ... $115_{Nm}$ and the pixel circuits $15_{1m}$, $15_{2m}$, $15_{3m}$ ... $15_{Nm}$. The optical sensors and pixel circuits alternate along one side of the shared data line $20_m$. Thus optical sensor $115_{n1}$ is adjacent the pixel circuit $15_{n1}$.

A particular one of the N×M optical sensors $115_{nm}$ can be addressed via its associated row select line $21_n$ and its associated column select line $120_m$ and the optical value sensed is provided by its associated data line $20_m$.

As the data lines $20_m$ are shared in the preferred embodiment, the display matrix of pixel circuits and the sensor matrix of optical sensors should not operate at the same time. Thus when pixel circuit $15_{nm}$ is operating the optical sensor $115_{nm}$ is not operating.

The pixel at (a,b) is addressed using V1 volts on the row select line $21_a$ and a greyscale voltage value on data line $20_b$. The pixel elements 15 in the row a are enabled by V1 on the row select line $21_a$, whereas the optical sensors 115 in the row a are disabled by V1 on the row select line $21_a$. The voltage V4 applied to the row select lines $21_n$, where n=1, 2 ... N but not including a, is such that both the pixel elements and the optical sensors of those rows are disabled.

The optical sensor at (a,b) is addressed using V2 volts on the row select line $21_a$ and asserting V3 volts on the column select line $120_b$. The output of the optical sensor is provided on data line $20_b$. The voltage V2 on the row select line $21_a$ allows the optical sensors in row a to be addressed but disables the pixel circuits of the row select line $21_a$. The voltage V5 applied to the row select lines $21_n$, where n=1, 2 ... N but not including a, is such that both the pixel elements and the optical sensors of those rows are disabled.

The voltage V5 is preferably the same as the voltage V4. Thus in the preferred embodiment, each of the row select lines $21_n$ is a tri-state line having three possible states V1, V4/V5, V2. The pair combination (V1, V4) is used in a display mode to respectively enable and disable a row of pixel elements. The pair combination (V2, V4) is used in a sensing mode to respectively enable and disable a row of optical elements.

Figure 1:
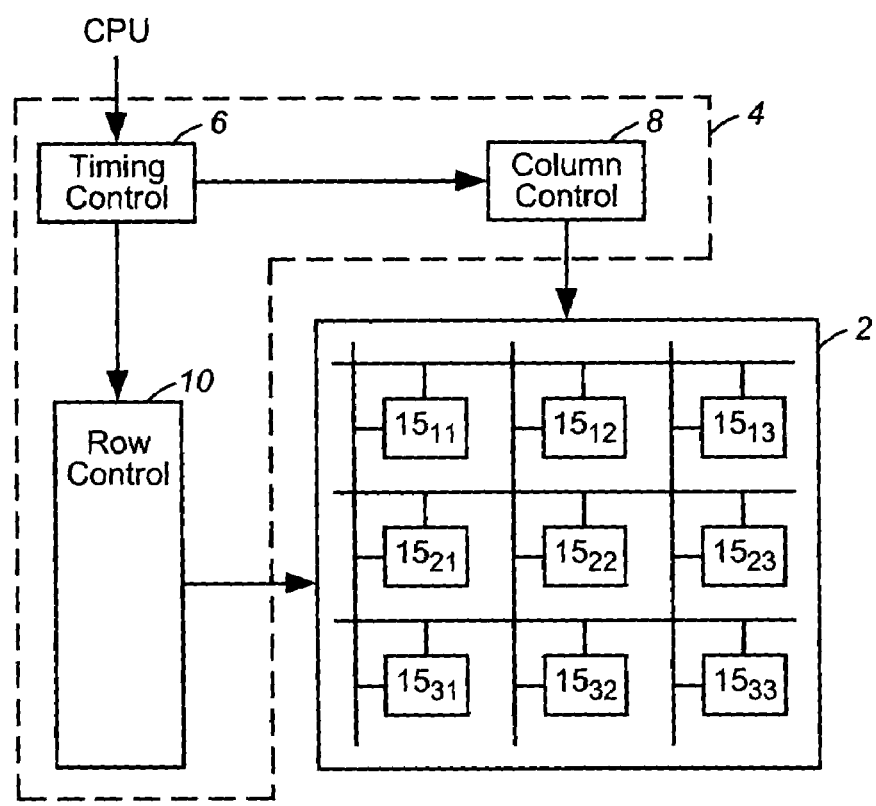
FIG. 1 illustrates a prior art flat panel display device.

Referring to FIG. 4, the control circuitry comprises timing control circuitry 106, column control circuitry 108 and row selection circuitry 110 and additionally comprises sensing circuitry 112. The control circuitry, when in the display mode, operates in accordance with the description of the control circuitry 4 given in relation to FIG. 1. The row selection circuitry 110 and column control circuitry 108 paint a first row. The row selection circuitry 110 provides the voltage V1 on the row select line $21_1$ and provides the voltage V4 on each of the other row select lines. The M pixel circuits $15_{1m}$, where m=1, 2, 3 ... M, in the first row are thereby enabled. The column control circuitry 108 converts each of the greyscale values for the M pixels in row n provided from the computer to voltage values and applies the voltage to each of the M data lines $20_m$, where m=1, 2, 3 ... M. The voltage on a data line determines the greyscale of the enabled pixel connected to it. The row selection circuitry 110 and column control circuitry 108 then paint a second row—the row selection circuitry 110 asserts the select line $21_2$ for the next row and the column control circuitry controls the greyscale of the pixels in that row. Thus one row of pixels is painted at a time and each row is painted in order until the display frame is complete. The computer then provides the greyscale value of each pixels of the display matrix for the next display frame and it is painted one row at a time.

In the sensing mode, the row select lines $21_n$ and column select lines $120_n$ are successively scanned and the output taken from the data lines $20_n$. The row selection circuitry 110 and the column control circuitry select a first row of optical sensors. The row selection circuitry 110 provides the voltage V2 on the row select line $21_1$ and provides the voltage V5 on each of the other row select lines. The column control circuitry 108 provides the voltage V3 to each of the column select lines $120_n$. The M optical sensors $115_{1m}$, where m=1, 2, 3 ... M, in the first row are thereby enabled and respectively provide outputs on the data lines $20_m$. The sensing circuitry 112 converts each of the M outputs on the data lines $20_m$ to M digital values $D_{1m}$, where m=1, 2, 3 ... M, each of which represents the intensity of the light incident upon an individual one of the M optical sensors $115_{1m}$. The sensing circuitry 112 provides the digital values, through the timing controller 105, to the computer. The row selection circuitry 110 selects a second row of optical sensors by providing the voltage V2 on the select line $21_2$ and the voltage V5 on each of the other row select lines.

Thus one row of optical sensors is sensed at a time and each row is sensed in order until the sensing frame is complete.

To combine display and sensor operation the display mode and sensing mode should not overlap. The display mode occurs at a display frame frequency fd whereas the sensing mode occurs at a sensing frame frequency fs. When fd=fs, one display frame is completed, then a sensing frame is completed, then a display frame is completed etc. However, depending on the desired sampling frequency and display frame rate, the ratio between the display frame frequency and sensing frame frequency can be adjusted from 1:1.

The N×M digital values obtained from each optical frame scan represent the brightness of the light incident upon the N×M matrix of optical sensors. In the preceding description, only monochrome pixels and optical sensors have been described. It should, however, be appreciated that primary colour (e.g. Red (R), green (G) and blue (B)) pixel clusters can be used to produce a colour image. Likewise, separate optical sensors for detecting primary colour light can be clustered together. Thus the arrangement would be equivalent to that described above except that there would be 3NM optical sensors and pixels and 3NM digital values obtained from each optical frame scan, NM values for each of the primary colour. The number of primary colours is arbitrary but is commonly three (RGB).

"Touch Input"

The digital values $D_{nm}$ respectively corresponding to the outputs of the optical sensors $115_{nm}$ and obtained from an optical frame scan are processed by the programmed computer (or alternatively a dedicated programmed microprocessor or ASIC) to determine whether a user has made an input by bring a digit close to the input/output matrix 102. The digital values $D_{nm}$ are processed to calculate the average value D.

In a bright environment, a finger brought close to the input/output matrix 102 casts a shadow, whereas in a dark environment a finger brought close to the input/output matrix reflects light from the output display matrix onto the input sensor matrix. The environment is detected by comparing D to a predetermined threshold. If D is greater than a threshold X1 (i.e. a bright environment), the values $D_{xy}$ which are less than D by a predetermined threshold are identified as the input values. If D is less than a threshold X2 (i.e. a dark environment), the values $D_{xy}$ which are greater than D by a predetermined threshold are identified as the user input values.

Optionally either as an alternative or an addition, the values $D_{nm}$ (previous) of the preceding optical frame scan are compared to the values $D_{nm}$ (current) of the current optical frame scan. If D is greater than a threshold X1 (i.e. a bright environment), the values $D_{xy}$ for which $D_{xy}$ (previous)–$D_{xy}$ (current) is greater than a threshold are identified as possible user input values. If D is less than a threshold X2 (i.e. a dark environment), the values $D_{xy}$ for which $D_{xy}$ (current)–$D_{xy}$ (previous) is greater than a threshold are identified as possible user input values.

Where X2<D<X1, i.e. when the intensity of light reflected from the finger is comparable to that of the ambient light, discrimination cannot be done by comparing only the intensities. The spectrum of the backlight source is known from the manufacturer specification of the backlight (commonly light-emitting diode (LED) or cold-cathode fluorescent tube (CCFL)), and the relative RGB values for backlight reflected from the finger into optical sensors can be determined from the output of the optical sensors. These RGB values have different ratios for ambient light so the finger position can be determined by comparing the average relative RGB values instead of the intensities.

"Gesture Input"

The digital values $D_{nm}$ respectively corresponding to the outputs of the optical sensors $115_{nm}$ and obtained from an optical frame scan are processed by the programmed computer (or alternatively a dedicated programmed microprocessor or ASIC) to determine whether a user has made an input by performing a gesture in front of the input/output matrix 102. Gestures in front of the input/output matrix 102 create a shadow pattern on the sensor matrix in a bright environment or, in a dark environment, a spatial distribution of reflected light from the hand illuminated by the display matrix. The shadow pattern is detected as described above for "touch input". The time variance in the shadow pattern is identified as an input gesture by an image-recognition engine.

Luminance Correction

The digital values $D_{nm}$ respectively corresponding to the outputs of the optical sensors $115_{nm}$ and obtained from an optical frame scan are processed to calculate the average value D. It is well known that illuminated transmissive or emissive displays appear with lower contrast when the illumination is strong. Normally, this is compensated by boosting the overall display luminance, even in areas of the display where it is not needed. As a result, the power consumption will be unnecessarily high and the lifetime unnecessarily shortened. According to this embodiment, the luminance of the pixel in the pixel circuit $15_{ab}$ is increased if $D_{nm}$>D.

Figure 2:
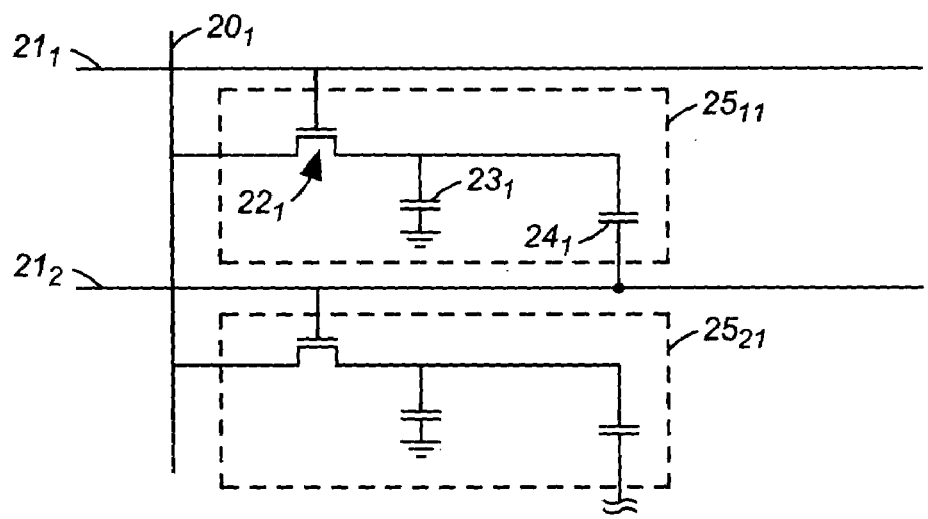
FIG. 2 illustrates a prior art pixel circuit for an TFTLCD.
Figure 3:
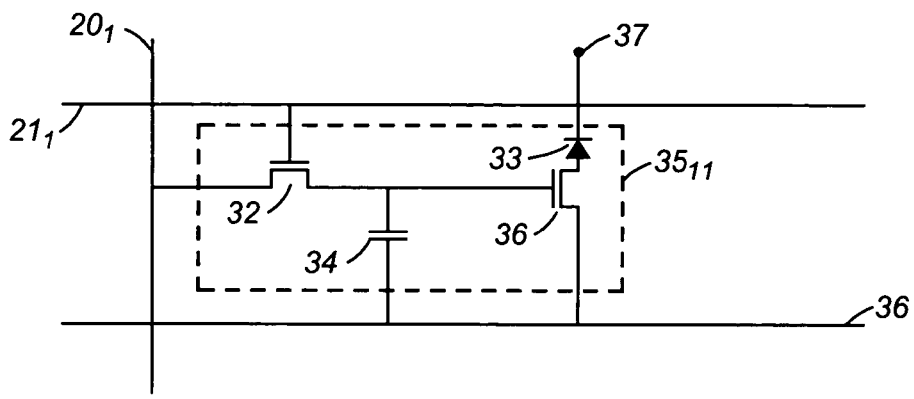
FIG. 3 illustrates a prior art pixel circuit for a current-driven active matrix display.

Referring back to FIG. 4, the optical sensor $115_{nm}$ is preferably, but not limited to, an n-channel phototransistor $114_{nm}$ with its source connected to the column select line $120_m$, its drain connected to the data line $20_m$ and its gate connected to the row select line $21_n$. FIG. 5 schematically illustrates a portion of an integrated circuit forming the input/output matrix 102. The illustrated portion of the integrated circuit comprises optical sensors $115_{11}$, $115_{12}$, $115_{21}$ and $115_{22}$, pixel circuits $15_{11}$, $15_{12}$, $15_{21}$ and $15_{22}$, data lines $20_1$ and $20_2$, row select lines $21_1$ and $21_2$ and column select lines $120_1$ and $120_2$. The pixel circuits are preferably for an active matrix display (reflective, transmissive or emissive) and in this example are for AMLCD as previously describe with reference to FIG. 2.

The phototransistors 114 are n-channel TFTs, preferably formed using a-Si or p-Si. The switching transistors 32 in the pixel circuits are n-channel TFTs, preferably formed using a-Si. The phototransistors and pixel circuits can therefore be formed in the same plane on the same substrate 103. In particular, the source/drain and channel components of the switching transistors 32 can be formed from the same semiconductor layers as the respective source/drain and channel components of the phototransistors 114. The gate electrodes of the switching TFT and the phototransistor are formed by back etching a single conductive layer.

The drain current dependence on gate voltage of the switching TFT $32_{nm}$ is made similar to the dark characteristics of the phototransistor $114_{nm}$ by using exactly the same transistor design but with an additional light-blocking layer lying over the switching transistor $32_{nm}$. The document "Fingerprint scanner using a-Si:H TFT array", by Jeong Kyun Kim, Jae Kyun Lee, Gyoung Chang, Beom Jin Moon; paper 24.1, SID International Symposium Digest of Technical Papers, pp 353–355 (2000) describes a fingerprint scanner in which a sensor thin film transistor and an identical switch thin film transistor with an additional light blocking layer are formed from a-Si:H.

The voltage V1 is positive whereas V2 and V3 are negative. Theses values depend upon the TFT, the operating range of which is selected for maximum linearity. Thus the phototransistor is operative when it is reversed biased and has a negative voltage at its gate. As the drain current dependence on gate voltage of the switching TFT $32_{nm}$ is similar to the dark characteristics of the phototransistor $114_{nm}$, the negative gate voltage V2 will not switch on the switching transistor $32_{nm}$ and therefore not affect the display addressing.

Although, an n-channel field effect phototransistor has been described, other photodetectors or phototransistors could be used. A common property of the applicable phototransistors is that the dark current at negative bias is small and that the ratio between photo- and dark current is large.

FIG. 6 illustrates a circuit for sensing the output from an optical sensor which would reside in sensing circuitry 112 illustrated in FIG. 4. If the optical sensors $114_{nm}$ are phototransistors, the electric current on data line $20_m$ is determined by the conductance of the phototransistor $114_{nm}$ when column select line $120_m$ is at −V3 volts and row select line $21_n$ is at −V2 volts. The phototransistor $114_{nm}$ is reversed biased and its conductivity depends strongly on the intensity of the light impinging on it. The variation in the electric current in data line $20_m$ is detected by a current-to-voltage converter for each row. This voltage is then digitized to produce the value $D_{nm}$. For current-driven displays, the voltage change is sensed instead.

The circuit comprises a resistor, a differential amplifier and an analogue to digital converter. The resistor is connected in series with data line $20_m$. The voltage across the resistor is measured by the differential amplifier and then converted to a digital value by the analogue to digital converter.

Although the present invention has been described in the preceding paragraphs with reference to various examples, it should be appreciated that modifications and variations to the examples given can be made without departing from the spirit and scope of the invention.

I claim:

1. An integrated circuit comprising:
    a substrate;
    a multiplicity of picture element circuits integrated on the substrate and arranged as a matrix display having a first plurality of rows and a second plurality of columns;
    a plurality of conductive data lines integrated on the substrate and arranged such that each one of the plurality of data conductive lines is associated with a different column of the matrix display and is directly connected to, always to be in electrical contact with, all the picture element circuits of its associated column;
    a multiplicity of sensors integrated on the substrate and arranged as a sensor matrix having a third plurality of rows and a fourth plurality of columns;
    a plurality of conductive row select lines integrated on the substrate and arranged such that each one of the plurality of conductive row select lines is associated with a different row of the sensor matrix and is directly connected to, always to be in electrical contact with, all the sensors of its associated row and also arranged such that each one of the plurality of conductive row select lines is associated with a different row of the matrix display and is directly connected to, always to be in electrical contact with, all the picture element circuits of its associated row; and
    a plurality of conductive column select lines integrated on the substrate and arranged such that each one of the plurality of conductive column select lines is associated with a different column of the sensor matrix and is directly connected to, always to be in electrical contact with, all the sensors of its associated column,
    wherein the plurality of conductive data lines are different than the plurality of conductive column select lines such that the columns of the matrix display are selectable in an independent manner relative to the columns of the sensor matrix.

2. An integrated circuit as claimed in claim 1, wherein the matrix display is an active matrix display and each picture element circuit comprises a switching transistor.

3. An integrated circuit as claimed in claim 2, wherein each of the switching transistors is a thin film transistor.

4. An integrated circuit as claimed in claim 3, wherein each of the thin film transistor comprises hydrogenated amorphous silicon.

5. An integrated circuit as claimed in claim 3, wherein each of the thin film transistors comprises hydrogenated amorphous silicon.

6. An integrated circuit as claimed in claim 1, wherein each sensor comprises a phototransistor.

7. An integrated circuit as claimed in claim 6, wherein each phototransistor is a thin film transistor.

8. An integrated circuit as claimed in claim 1, wherein the matrix display is an active matrix display and each picture element circuit comprises a switching transistor, wherein each sensor comprises a phototransistor and wherein the switching transistors and phototransistors are of substantially the same design except that each of the switching transistors additionally comprises a light-blocking layer.

9. An integrated circuit as claimed in claim 8, wherein the switching transistors and phototransistors are thin film transistors.

10. An integrated circuit as claimed in claim 9, wherein the switching transistors and phototransistors comprise hydrogenated amorphous silicon.

11. An integrated circuit as claimed in claim 1, wherein the matrix display is an active matrix display and each picture element circuit comprises a switching transistor, wherein each sensor comprises a phototransistor and wherein the switching transistors and phototransistors have gate electrodes and are arranged in pairs wherein a common electrode is used for the gate electrodes of the switching transistor and phototransistor in each pair.

12. An integrated circuit as claimed in claim 1, wherein the sensors and picture element circuits are paired each pair comprising a sensor and an adjacent picture element.

13. An integrated circuit as claimed in claim 1, wherein the second multiplicity of sensors of a number less than the first multiplicity of picture element circuits.

14. An integrated circuit as claimed in claim 1, wherein the sensor matrix is configured to provide sensed output via the conductive data lines.

15. An integrated circuit as claimed in claim 1, wherein operation of the sensor matrix and the matrix display do not overlap in time.

16. A combined input and output device having a display mode in which it operates as a matrix display and a sensing mode in which it receives optical input, comprising:
- a multiplicity of picture element circuits arranged as a matrix display having a first plurality of rows and a second plurality of columns;
- a multiplicity of optical sensors arranged as a sensor matrix having a third plurality of rows and a fourth plurality of columns;
- a plurality of conductive row select lines arranged such that, for each row of the matrix display, each of the picture element circuits of a row of the matrix display directly connects to one of the plurality of conductive row select lines always to be in electrical contact therewith and, for each row of the sensor matrix, each optical sensor of a row of the sensor matrix connected to one of the plurality of conductive row select lines, always to be in electrical contact therewith; and
- control circuitry for applying any one of at least three different control signals to the plurality of conductive row select lines,
- wherein the control circuitry is configured to apply to a conductive row select line:

(i) a first control signal to select the respective row of the matrix display without selection of the corresponding row of the sensor matrix, (ii) a second control signal, different than the first control signal, to select the respective row of the sensor matrix without selection of the corresponding row of the matrix display and (iii) at least a third control signal, different than the first and second control signals, to prevent selection of the respective row of both the matrix display and the sensor matrix.

17. A combined input and output device as claimed in claim 16, further comprising a plurality of conductive data lines and a plurality of conductive column select lines, the plurality of arranged such that, for each column of the matrix display, each of the plurality of picture element circuits of a column of the matrix display connects to one of the plurality of conductive data lines and, for columns of the sensor matrix, each of the plurality of optical sensors of a column of the sensor matrix connects to one of the plurality of conductive column select lines.

18. A combined input and output device as claimed in claim 17, wherein, during the sensing mode, the control circuitry is arranged to provide an input on each of the plurality of conductive column select lines.

19. A combined input and output device as claimed in claim 17, wherein the plurality of conductive data lines are different than the plurality of conductive column select lines such that the columns of the matrix display are selectable in an independent manner relative to the columns of the sensor matrix.

20. A combined input and output device as claimed in claim 19, wherein the control circuitry is arranged to provide inputs on the plurality of conductive data lines during the display mode and to receive outputs from the sensor matrix during the sensing mode.

21. A combined input/output device as claimed in claim 16 wherein said multiplicity of picture element circuits, said multiplicity of picture element circuits, said plurality of conductive row select lines, and said control circuitry are embodied as an integrated circuit.

22. A combined input and output device as claimed in claim 16, wherein during a display mode, the control circuitry applies the first control signal to one of the plurality of conductive row select lines and applies the third control signal to the others of the plurality of conductive row select lines.

23. A combined input and output device as claimed in claim 22, wherein during a sensing mode, the control circuitry applies the second control signal to one of the plurality of conductive row select lines and applies the third control signal to the others of the plurality of conductive row select lines.

24. A combined input and output device as claimed in claim 23, wherein the sensing mode and the display mode do not overlap in time.

\* \* \* \* \*